United States Patent
Fukiharu

(10) Patent No.: US 6,631,192 B1
(45) Date of Patent: Oct. 7, 2003

(54) CELLULAR PHONE WITH LIGHTING DEVICE AND METHOD OF CONTROLLING LIGHTING DEVICE

(75) Inventor: Eiichi Fukiharu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/400,915

(22) Filed: Sep. 22, 1999

(30) Foreign Application Priority Data

Sep. 29, 1998 (JP) .......................................... 10-274643

(51) Int. Cl.[7] ................................................. H04M 1/00
(52) U.S. Cl. .............................. 379/433.07; 379/433.06; 379/433.04; 379/368
(58) Field of Search ................................. 379/433, 368, 379/433.07, 433.04, 433.06; 455/575, 90, 567

(56) References Cited

U.S. PATENT DOCUMENTS 4,982,424 A * 1/1991 Saito et al. .................. 455/567

FOREIGN PATENT DOCUMENTS

| EP | 0 682 434 A2 | 11/1995 |
|---|---|---|
| EP | 0 883 274 A2 | 12/1998 |
| GB | 2 222 747 | 3/1990 |
| GB | 2 316 837 A | 3/1998 |
| JP | 2-73751 | 3/1990 |
| JP | 5-167658 | 7/1993 |
| JP | 7-74691 | 3/1995 |
| JP | 9-18564 | 1/1997 |
| JP | 9-27844 | 1/1997 |
| JP | 9-321853 | 12/1997 |
| JP | 10-190786 | 7/1998 |

* cited by examiner

*Primary Examiner*—Jack Chiang
(74) *Attorney, Agent, or Firm*—McGinn & Gibb, PLLC

(57) ABSTRACT

There is provided a cellular phone including (a) a display, (b) a key pad arrangement, (c) a lighting device which lights at least one of the display and the key pad arrangement, (d) a touch sensor which is turned on upon making contact with a user and transmits a first signal, and turned off upon making no contact with a user and transmits a second signal, and (e) a controller which turns the lighting device on upon receiving the second signal from the touch sensor, and turns the lighting device off upon receiving the first signal from the touch sensor. The cellular phone can reduce electric power consumption, because the lighting device does not consume electric power while the cellular phone is in use, enabling a use of a smaller-sized cell.

10 Claims, 2 Drawing Sheets

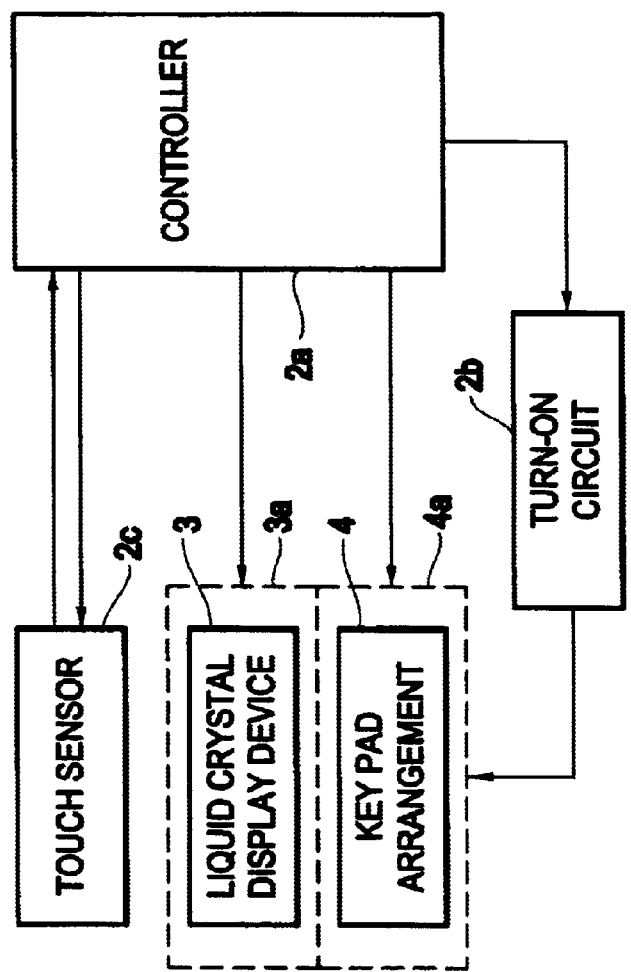
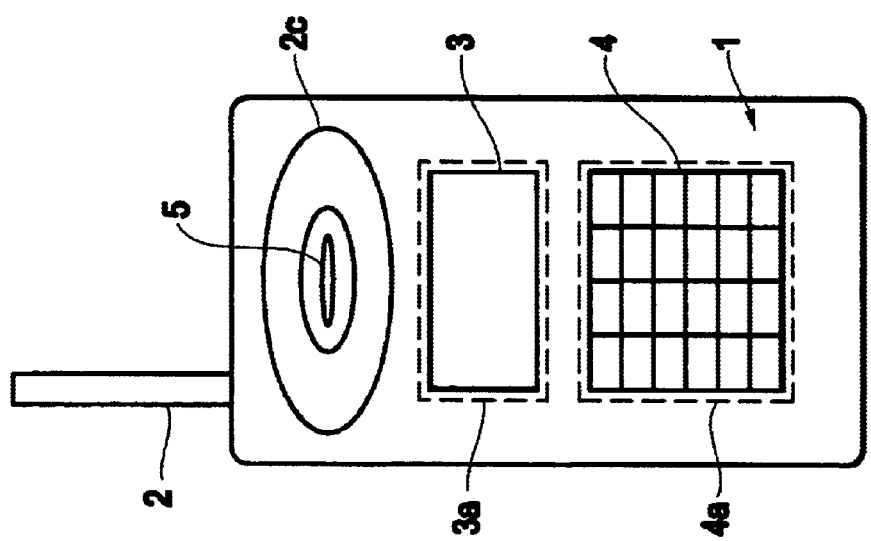

CELLULAR PHONE WITH LIGHTING DEVICE AND METHOD OF CONTROLLING LIGHTING DEVICE

BACKGROUND OF THE INVENTION

1. Field of the Iinvention

The invention relates to a cellular phone, and more particularly to a cellular phone capable of reducing electric power consumption to thereby make it possible to use a smaller-sized cell. The invention also relates to a method of controlling a lighting device of a cellular phone, which method is capable of doing the same.

2. Description of the Related Art

Since a current cellular phone makes radio signal communication, a user can use a cellular phone indoors and outdoors, even while he or she is moving. Thus, a cellular phone is now indispensable for daily life as well as for business, and is widely used day and night.

Since a cellular phone is characterized by its mobility, it is designed to include a cell or battery designed as light as possible, as a power source, and also include circuits which can operate in electric power as small as possible.

Most of cellular phones now available are designed to have a liquid crystal display device for receiving and transmitting symbol data such as a picture, a letter and other characters, as well as a function of communication originally required for a telephone. Such cellular phones are designed to include a lighting device, usually a back light device, for lighting a liquid crystal display device and/or key pads for a user to clearly read a screen of the liquid crystal display device and correctly select a desired key pad even at night or even in poor lighting circumstance.

A lighting device used for lighting a liquid crystal display device and key pads generally consumes electric power much more than electric power to be consumed by other circuits which make communication. It would be necessary for a cellular phone to include a battery having a big capacity, in order to sufficiently operate such a lighting device, which would cause a problem that a cellular phone has to be formed larger in a size, resulting in reduction in portability of a cellular phone.

In order to solve such a problem, there have been suggested a lot of attempts to minimize a size of a lighting device in a cellular phone.

For instance, a certain cellular phone is designed to include a lighting device which is tuned on when the cellular phone detects certain sound such as voice. At the same time when the lighting device is turned on, a timer equipped in the cellular phone starts its operation. When a period of time having been set in the timer has passed, the lighting device is turned off.

However, the cellular phone is accompanied with a problem that the lighting device which is now turned off might be turned on when the cellular phone is in use in noisy circumstance, resulting in failure in saving of electric power.

Japanese Unexamined Patent Publication No. 9-27844 has suggested a cellular phone which attempts to minimize a period of time in which a lighting device such as a back light device is turned on for lighting a liquid crystal display device. When it is dark, the lighting device is turned on, for instance, when a key is actuated for starting communication, or when the cellular phone receives a call. At the same time, a timer is made to start. When user's voice is input into a speaker or when a certain period of time has passed, the lighting device is turned off.

Japanese Unexamined Patent Publication No. 9-321853 has suggested a cellular phone comprised of means for detecting start and finish of communication therethrough. When start of communication is detected, a back light device is turned off, if the back light device is turned on. When finish of communication is detected, the back light device is kept turned on in a certain period of time.

Japanese Unexamined Patent Publication No. 7-74691 has suggested a foldable cellular phone including a first plane on which dial keys are arranged and a second plane on which no dial keys are arranged. Optical sensors are formed on at least one of the first and second planes for detecting brightness therearound. When the optical sensors detect that it is dark and when a detector detects that a dial key is actuated, LED is turned on for lighting both the dial key and LCD. When the optical sensors receive light emitted from LED, the cellular phone is put into a low power consuming condition in which the cellular phone is allowed only to receive a call.

Japanese Unexamined Patent Publication No. 5-167658 has suggested a cellular phone which attempts to minimize power consumption of a battery. The cellular phone is comprised of a lighting device, an optical sensor which detects brightness therearound and transmits a detection signal when the detected brightness is lower than a threshold value, and a driver circuit which, upon receipt of the detection signal transmitted from the optical sensor, supplies electric power to the lighting device.

Japanese Unexamined Patent Publication No. 9-18564 has suggested a phone which can be used even in darkness and reduce power consumption. The phone is comprised of a lighting device, a switch through which electric power is supplied to the lighting device, first means for detecting that a man approaches the cellular phone, a first timer which controls the switch so that the lighting device is kept turned on in a certain period of time, when the first means has detected that a man approaches the cellular phone, and a second timer which controls the switch so that the lighting device is kept turned on for a second period of time, when a key is actuated while the lighting device is on.

However, it remains impossible to sufficiently reduce electric power consumption of a lighting device in a cellular phone even by the cellular phones having been suggested in the above-mentioned Publications.

SUMMARY OF THE INVENTION

It is an object of the present invention to provide a cellular phone and a method of controlling a lighting device in a cellular phone both of which are capable of reducing electric power consumption of a lighting device in a cellular phone.

In one aspect of the present invention, there is provided a cellular phone including (a) a display, (b) a key pad arrangement, (c) a lighting device which lights at least one of the display and the key pad arrangement, and (d) a controller which turns the lighting device on when the cellular phone is not in use, and turns the lighting device off when the cellular phone is in use.

There is further provided a cellular phone including (a) a display, (b) a key pad arrangement, (c) a lighting device which lights at least one of the display and the key pad arrangement, (d) a touch sensor which is turned on upon making contact with a user and transmits a first signal, and turned off upon making no contact with a user and transmits a second signal, and (e) a controller which turns the lighting device on upon receiving the second signal from the touch sensor, and turns the lighting device off upon receiving the first signal from the touch sensor.

It is preferable that the touch sensor is formed at a surface of the cellular phone. The touch sensor may be formed around a receiver of the cellular phone.

It is preferable that the cellular phone further includes a display drive circuit which drives the display, and wherein the controller turns the display drive circuit on upon receiving the second signal from the touch sensor, and turns the display drive circuit off upon receiving the first signal from the touch sensor.

In another aspect of the present invention, there is provided a method of controlling a lighting device which lights at least one of a display and a key pad arrangement in a cellular phone, including the steps of (a) turning the lighting device on while the cellular phone is not in use, and (b) turning the lighting device off while the cellular phone is in use.

There is further provided a method of controlling a lighting device which lights at least one of a display and a key pad arrangement in a cellular phone, including the steps of (a) detecting whether the cellular phone is in contact with a user, (b) turning the lighting device on while the cellular phone is not in contact with a user, and (c) turning the lighting device off while the cellular phone is in contact with a user.

It is preferable that it is detected whether the cellular phone is in contact at a surface thereof with a user in the step (a). It may be detected whether the cellular phone is in contact around a receiver of the cellular phone with a user in the step (a).

It is preferable that the cellular phone further comprises a display drive circuit which drives the display, and the display drive circuit is also turned on in the step (b) while the cellular phone is not in contact with a user, and is also turned off in the step (c) while the cellular phone is in contact with a user.

In this specification, the phrase "a cellular phone is in use" means a state in which a user makes communication through a cellular phone, and the phrase "a cellular phone is not in use" means a state in which a user does not make communication through a cellular phone though the cellular phone is turned on.

In the present invention, when the touch sensor makes no contact with a user and hence is turned on, it is deemed that the cellular phone is not in use. Whereas, when the touch sensor makes contact with a user and hence is turned off, it is deemed that the cellular phone is in use. Hence, when the lighting device is turned on in darkness for lighting a liquid crystal display device and key pad arrangement, if a user puts the cellular phone to his/her ear to hear a call, the touch sensor is turned on, and as a result, the lighting device is turned off. Thus, the present invention makes it possible to reduce electric power consumption in the lighting device.

Reduction in electric power consumption in the lighting device makes it possible to lengthen a period of time for communication and stand-by in one battery charge, and further makes it possible to reduce a battery in a size.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 1 is a plan view of a cellular phone in accordance with a preferred embodiment of the present invention.

FIG. 2 is a block diagram of the cellular phone illustrated in FIG. 1.

DESCRIPTION OF THE PREFERRED EMBODIMENTS

Figure 3:
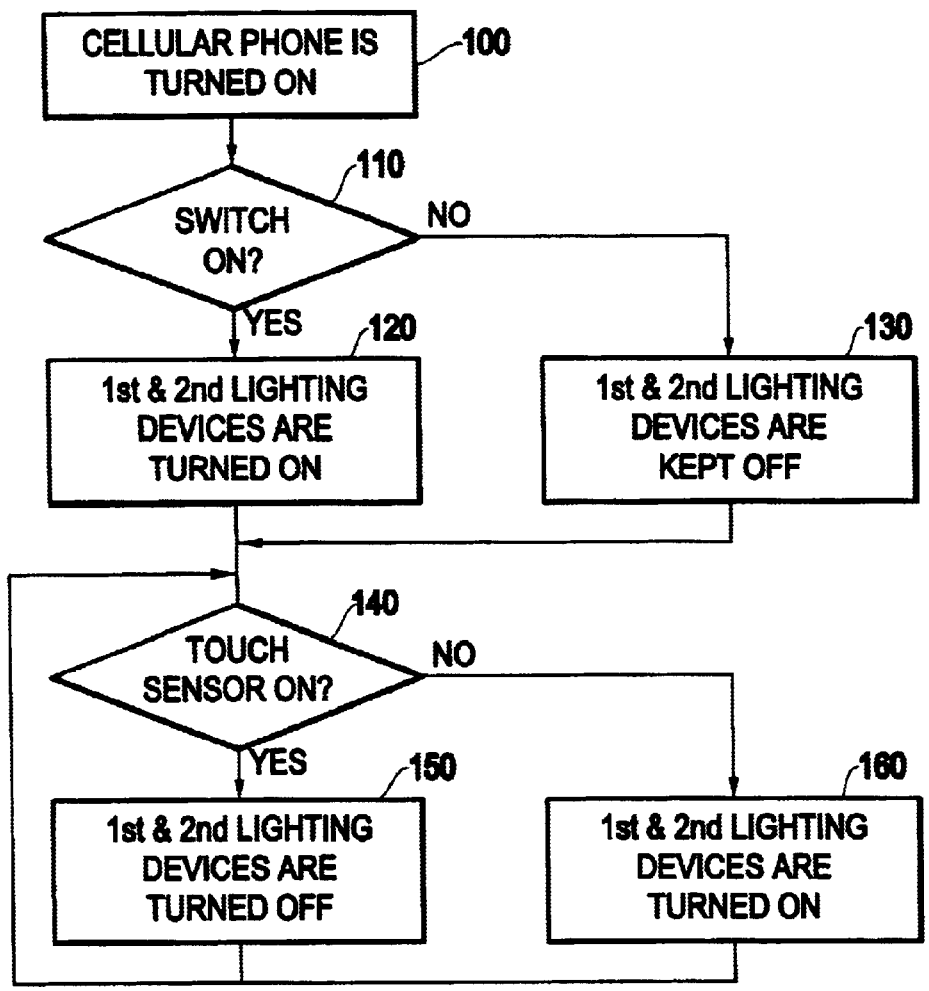
FIG. 3 is a flow chart showing an operation of the lighting device of the cellular phone illustrated in FIG. 1.

With reference to FIG. 1, a cellular phone 1 in accordance with the embodiment is comprised of an antenna 2 through which data is received or transmitted, a liquid crystal display device 3 in which received data is displayed, a key pad arrangement 4 situated below the liquid crystal display 3 for inputting commands into a later mentioned controller 2a, a receiver 5 through which a user hears a call, located above the liquid crystal display device 3, a touch sensor 2c formed around the receiver 5, a first back light device 3a for lighting the liquid crystal display device 3 from backward, a second back light device 4a for lighting the key pad arrangement 4 from backward, and a circuit 2b for controlling the first and second back light devices 3a and 4a to be turned on or off in accordance with a control signal transmitted from a controller 2a.

The first lighting device 3a for lighting the liquid crystal display device 3 is comprised of either a light-emitting diode (LED) and an optically conductive plate, or an electroluminescence (EL) device. The second lighting device 4a for lighting the key pad arrangement 4a is comprised of a light-emitting diode.

With reference to FIG. 2, the cellular phone further includes a controller 2a. The controller 2a transmits a signal to the touch sensor 2c to thereby activate or inactivate the touch sensor 2c. The controller 2a receives signals transmitted from the touch sensor 2c, and controls the first and second lighting devices 3a and 4a to turn on or off them through the circuit 2b in accordance with the signals transmitted from the touch sensor 2c.

The touch sensor 2c turns on and transmits a first signal when the touch sensor 2c makes contact with a user. On the other hand, the touch sensor 2c turns off and transmits a second signal when the touch sensor 2c makes no contact with a user.

The controller 2a turns the first and second lighting devices 3a and 4a on through the circuit 2b when the controller 2a receives the second signal from the touch sensor 2c. On the other hand, the controller 2a turns the first and second lighting devices 3a and 4a off through the circuit 2b through the circuit 2b when the controller 2a receives the first signal from the touch sensor 2c.

Hereinbelow is explained an operation of the cellular phone illustrated in FIGS. 1 and 2, with reference to FIG. 3.

The cellular phone 1 is turned on in step 100 when a power switch in the key pad arrangement 4 is activated.

Then, if a user actuates a lighting switch in the key pad arrangement (YES in step 110), the first and second lighting devices 3a and 4a are both turned on, in step 120. Thus, the liquid crystal display device 3 and the key pad arrangement 4 are both lighted. If a user does not actuate a lighting switch (NO in step 110), the first and second lighting devices 3a and 4a are both kept off, in step 130. Thus, the liquid crystal display device 3 and the key pad arrangement 4 are not lighted.

Then, the touch sensor 2c is activated or in operation by actuating a certain switch in the key pad arrangement.

If a user brings the cellular phone 1 to his/her ear to start communication through the cellular phone 1 (YES in step 140), the touch sensor 2c is turned on, and transmits the first signal to the controller 2a. Upon receipt of the first signal from the touch sensor 2c, the controller 2a deems that the cellular phone 1 is in use, and turns the first and second lighting devices 3a and 4a off, in step 150. Thus, the liquid crystal display device 3 and the key pad arrangement 4 are lighted.

If a user keeps away the cellular phone 1 therefrom (NO in step 140), the touch sensor 2c is turned off, and transmits the second signal to the controller 2a. Upon receipt of the second signal from the touch sensor 2c, the controller 2a deems that the cellular phone 1 is not in use. Hence, the controller 2a turns the first and second lighting devices 3a and a on, if the first and second lighting devices 3a and 4a have been kept turned off, or keeps both the first and second lighting devices 3a and 4a turned on, if the first and second lighting devices 3a and 4a have been turned on, in step 160.

Though the touch sensor 2c is turned off and hence the lighting devices 3a and 4a are turned on, if the lighting switch is inactivated, the lighting devices 3a and 4a are turned off.

The cellular phone 1 may be designed to include a display drive circuit which drives the liquid crystal display device 3. In such arrangement, the controller 2a may turn the display drive circuit on upon receiving the second signal from the touch sensor 2c, and may turn the display drive circuit off upon receiving the first signal from the touch sensor 2c. Thus, it would be possible to further reduce power consumption in the cellular phone.

In the above-mentioned embodiment, the first and second lighting devices 3a and 4a are always turned on or off together. However, only one of the first and second lighting devices 3a and 4a may be turned on or off in dependent on cases.

While the present invention has been described in connection with certain preferred embodiments, it is to be understood that the subject matter encompassed by way of the present invention is not be limited to those specific embodiments. On the contrary, it is intended for the subject matter of the invention to include all alternatives, modifications and equivalents as can be included within the spirit and scope of the following claims.

The entire disclosure of Japanese Patent Application No. 10-274643 filed on Sep. 29, 1998 including specification, claims, drawings and summary is incorporated herein by reference in its entirety.

What is claimed is:

1. A cellular phone comprising:
   (a) a display;
   (b) a power switch for switching power to said cellular phone;
   (c) a key pad arrangement;
   (d) a lighting device which lights both of said display and said key pad arrangement together;
   (e) a touch sensor which is turned on upon making contact with a user and transmits a first signal, and turned off upon making no contact with a user, and transmits a second signal;
   (f) a display driver which drives said display; and
   (g) a controller which turns said lighting device and said display driver on upon receiving said second signal from said touch sensor, and turns said lighting device and said display driver off upon receiving said first signal from said touch sensor, wherein said lighting device comprises a first lighting device for said display and a second lighting device for said key pad arrangement and wherein said key pad arrangement comprises another switch that activates said touch sensor.

2. The cellular phone as set forth in claim 1, wherein said touch sensor is formed at a surface of said cellular phone.

3. The cellular phone as set forth in claim 1, wherein said touch sensor is formed around a receiver of said cellular phone.

4. The cellular phone as set forth in claim 1, further comprising a display drive circuit which drives said display, and wherein said controller turns said display drive circuit on upon receiving said second signal from said touch sensor, and turns said display drive circuit off upon receiving said first signal from said touch sensor.

5. A method of controlling a lighting device which lights both of a display and a key pad arrangement and a display driver for a display in a cellular phone, comprising:
   (a) detecting whether said cellular phone is in contact with a user;
   (b) turning said lighting device and said display driver on while said cellular phone is not in contact with a user; and
   (c) turning said lighting device and said display driver off while said cellular phone is in contact with a user, wherein said lighting device comprises a first lighting device for said display and a second lighting device for said key pad arrangement, wherein said cellular phone comprises a power switch for switching power to said cellular phone and wherein said key pad arrangement comprises another switch that activates said touch sensor.

6. The method as set forth in claim 5, wherein it is detected whether said cellular phone is in contact at a surface thereof with a user in said step (a).

7. The method as set forth in claim 5, wherein it is detected whether said cellular phone is in contact around a receiver of said cellular phone with a user in said step (a).

8. The method as set forth in claim 5, wherein said cellular phone further comprises a display drive circuit which drives said display, and wherein said display drive circuit is also turned on in said step (b) while said cellular phone is not in contact with a user, and is also turned off in said step (c) while said cellular phone is in contact with a user.

9. The cellular phone as set forth in claim 1, wherein the lighting device comprises first and second lighting devices.

10. The cellular phone as set forth in claim 1, further comprising:
   a circuit electrically connected to the first lighting device, the second lighting device, and said controller, wherein the controller transmits signals to both the first lighting device and the second lighting device through the circuit.

* * * * *